(12) United States Patent
Pavlienova et al.

(10) Patent No.: US 10,102,122 B2
(45) Date of Patent: Oct. 16, 2018

(54) PERSONAL COMPUTING DEVICE FOR EDITING MAINFRAME DATA

(71) Applicant: CA, Inc., New York, NY (US)

(72) Inventors: Maryna Pavlienova, Prague (CZ); Corinne Destefano, Port Jefferson Station, NY (US); Philippe Dubost, Prague (CZ)

(73) Assignee: CA, Inc., New York, NY (US)

( * ) Notice: Subject to any disclaimer, the term of this patent is extended or adjusted under 35 U.S.C. 154(b) by 179 days.

(21) Appl. No.: 14/865,097

(22) Filed: Sep. 25, 2015

(65) Prior Publication Data
US 2017/0094028 A1    Mar. 30, 2017

(51) Int. Cl.
G06F 15/16    (2006.01)
G06F 12/08    (2016.01)

(52) U.S. Cl.
CPC .................... *G06F 12/08* (2013.01)

(58) Field of Classification Search
CPC ......... G06F 17/30569; G06F 17/30914; H04L 67/06; H04L 67/42
See application file for complete search history.

(56) References Cited

U.S. PATENT DOCUMENTS

| | | | | |
|---|---|---|---|---|
| 6,313,834 B1* | 11/2001 | Lau | ................... | G06F 17/30572 707/999.102 |
| 8,290,987 B2* | 10/2012 | Lehr | ................. | G06F 17/30339 707/802 |
| 2007/0150562 A1* | 6/2007 | Stull | ................. | G06F 17/30893 709/223 |
| 2013/0054887 A1* | 2/2013 | Ho | .......................... | G06F 3/064 711/111 |
| 2013/0079070 A1* | 3/2013 | Losiewicz | ............ | H04B 1/3833 455/575.8 |
| 2016/0364302 A1* | 12/2016 | Huber | ................. | G06F 11/1469 |

OTHER PUBLICATIONS

Toolbox for IT Groups, "Excel Macro for IBM Mainframe 3270", pp. 1-15, retrieved on Aug. 3, 2015, retrieved from Internet http://visualbasic.ittoolbox.com/groups/technical-functional/vb-vba-l/excel-macro-for-ibm-mainframe-3270-4660764.

IT Knowledge Exchange, "How can I import data to mainframe from Excel in REXX", pp. 1-3, retrieved on Aug. 3, 2015, retrieved from Internet http://itknowledgeexchange.techtarget.com/itanswers/how-can-i-import-data-to-mainframe-from-excel-in-rexx/.

(Continued)

*Primary Examiner* — Liangche A Wang
*Assistant Examiner* — Ayele Woldemariam
(74) *Attorney, Agent, or Firm* — Meyertons, Hood, Kivlin, Kowert & Goetzel, P.C.

(57) ABSTRACT

A personal computer executes a productivity application that communicates with a mainframe computer via a communications network. The productivity application configures the personal computer to retrieve datasets formatted according to a format associated with the mainframe and convert the data in the datasets to a second format native to the productivity application. While in the second format, a user may modify the data. If so, the productivity application configures the personal computer to convert the data back to the first format, update control fields in the data set, and send the modified dataset back to the mainframe.

15 Claims, 8 Drawing Sheets

(56) References Cited

OTHER PUBLICATIONS

Excel Help Forum, "How to transfer a mainframe file to excel", pp. 1-2, retrieved on Aug. 3, 2015, retrieved from Internet http://www.excelforum.com/excel-general/364540-how-to-transfer-a-mainframe-file-to-excel.html.

PC Review, "mainframe file to excel spreadsheet", pp. 1-12, retrieved on Aug. 3, 2015, retrieved from Internet http://www.pcreview.co.uk/threads/mainframe-file-to-excel-spreadsheet.3060218/.

download.com, "2007 Microsoft Office Add-in: Microsoft Save as PDF", pp. 1-3, retrieved on Sep. 25, 2015, retrieved from Internet http://download.cnet.com/2007-Microsoft-Office-Add-in-Microsoft-Save-as-PDF/3000-18483_4-10742065.html.

* cited by examiner

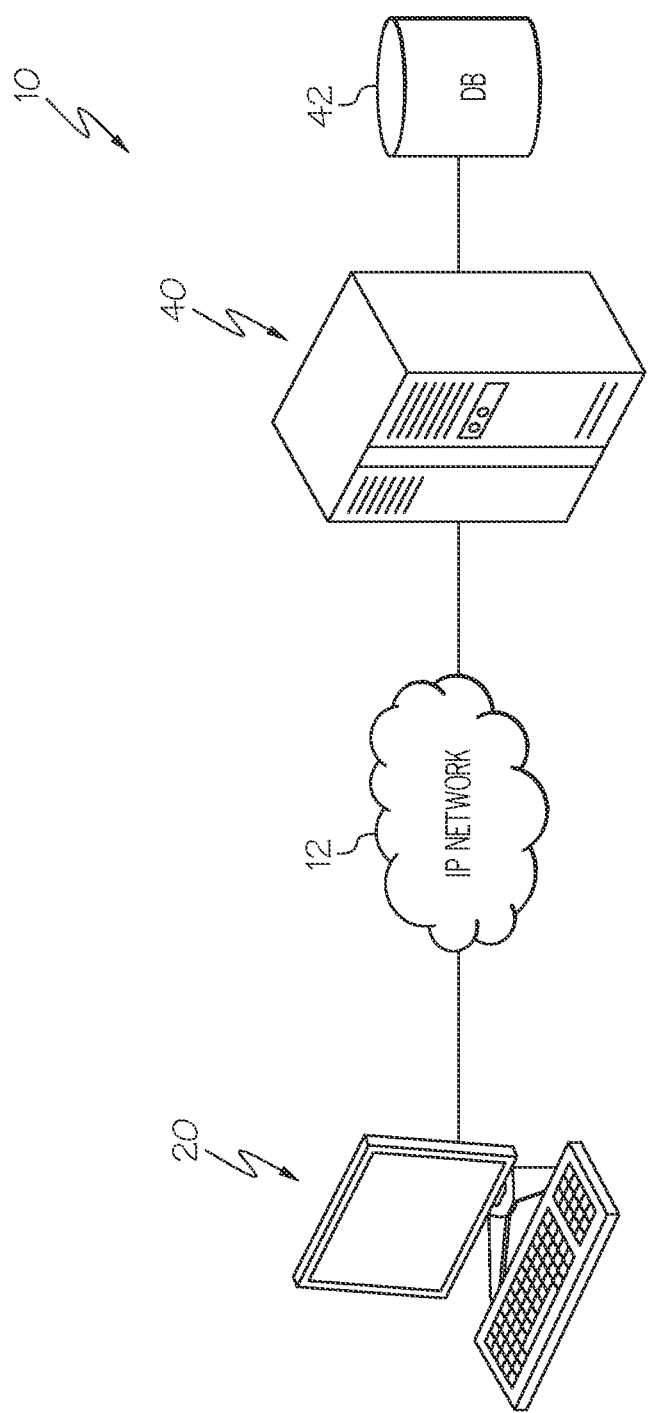

| FILE | WINDOW | HELP | | | | |
|---|---|---|---|---|---|---|
| DIRECTORY LIST | SELECTION | LAYOUTS | EMPLOYEES [READ-ONLY] × | | | |
| 000001 | 1 | 000100 | JACKFROST | ETHEL DR. | NEW HAVEN | CT06032-1234b .<h% . i a@k.@ @.o* |
| 000002 | 1 | 000113 | BARRY DILLER | 2383 FOREST ST. | NEW HAVEN | CT06031-1544a-. <.*.@. .. m-h @ d<.% . @ |
| 000003 | 1 | 000126 | CHARLES HENRY | 1774 FERN CIRCLE | NEW HAVEN | CT06015-1544 < . .. .j. .. .j. |
| 000004 | 1 | 000139 | TOKO KARZI | 430 HOLLY CT. | NEW HAVEN | CT06040-9834... @ . / .m ." ... .." |
| 000005 | 1 | 000152 | BETTER CROCKER | 1567 WHITE LN | NEW HAVEN | CT06002-1454 d@k . ,e. . % @!p .%0 .. n@n. |
| 000006 | 1 | 000165 | NANCY GRACE | 982 TOEPFER AVE | NEW HAVEN | CT06032-1984p . m @ .f . . . b%.. < |
| 000007 | 1 | 000178 | TIME JONES | 29 MAPLE AVE | NEW HAVEN | CT06033-1344/ %.. .%...?ge* .' d e>. dg@ |
| 000008 | 1 | 000191 | JACK REDMAN | 2322 HIWAY N | NEW HAVEN | CT06031-0982f. . ad p .c% . .%h d. . d<.@. . |
| 000009 | 1 | 000204 | LARRY ELDMAN | 56 JACK ST. | NEW HAVEN | CT06029-1234d . "1 .b*. . n.%e |
| 000010 | 1 | 000217 | RICK CONE | 2309 W 56TH AVE. | NEW HAVEN | CT06028-0542fg . rg<. n . .. 1@c&* . . |

FIG. 2A

EMPLOYEES

| | A | B | C | D | E | F | G |
|---|---|---|---|---|---|---|---|
| 1 | | | | | | | |
| 2 | VSAM key | Priority | Alternative key | Name | Address | City | |
| 3 | 000001 | 1 | 0000100 | JACKFROST | ETHEL DR. | NEW HAVEN | CT06032-12 |
| 4 | 000002 | 1 | 0000113 | BARRY DILLER | 2383 FOREST ST. | NEW HAVEN | CT06031-15 |
| 5 | 000003 | 1 | 0000126 | CHARLES HENRY | 1774 FERN CIRCLE | NEW HAVEN | CT06015-15 |
| 6 | 000004 | 1 | 0000139 | TOKO KARZI | 430 HOLLY CT. | NEW HAVEN | CT06040-9 |
| 7 | 000005 | 1 | 0000152 | BETTER CROCKER | 1567 WHITE LN | NEW HAVEN | CT06002-14 |
| 8 | 000006 | 1 | 0000165 | NANCY GRACE | 982 TOEPFER AVE. | NEW HAVEN | CT06032-19 |
| 9 | 000007 | 1 | 0000178 | TIME JONES | 29 MAPLE AVE | NEW HAVEN | CT06033-13 |
| 10 | 000008 | 1 | 0000191 | JACK REDMAN | 2322 HIWAY N | NEW HAVEN | CT06031-09 |
| 11 | 000009 | 1 | 0000204 | LARRY ELDMAN | 56 JACK ST. | NEW HAVEN | CT06029-12 |
| 12 | 000010 | 1 | 0000217 | RICK CONE | 2309 W 56TH AVE | NEW HAVEN | CT06028-01 |

Context menu (66):
- Cut
- Copy
- Paste Options
- Paste Special...
- Insert...
- Delete...
- Clear Contents
- Filter ▶
- Sort ▶
- Insert Comment
- Format Cells...
- Pick From List
- Define name...

Submenu (68):
- Sort A to Z
- Put Selected Cell Color On Top
- Put Selected Font Color On Top
- Put Selected Cell Icon On Top
- Custom Sort...

FIG. 2B

PERSONAL COMPUTING DEVICE FOR EDITING MAINFRAME DATA

BACKGROUND

The present disclosure relates generally to computing devices, and more particularly to a personal computer configured for editing data stored and maintained by a mainframe computer.

Mainframe computers, or "mainframes," are primarily used by large corporate entities to execute various enterprise applications. Such applications include, but are not limited to, critical applications related to bulk data processing, process control, hosting, ecommerce, software development and/or testing, and planning. Typically, mainframe computers run proprietary Operating Systems (OS) and maintain data for critical applications using specialized interfaces. However, in many cases, these interfaces are compatible only with the critical applications executing on the mainframe. Further, the critical applications executing on the mainframe generally provide only a limited set of functionality for the user. That is, they are not designed to provide the full set of features and functions that some of the desktop-based "productivity applications" provide (e.g., MICROSOFT WORD, EXCEL, etc.) as they execute on a personal computing device.

BRIEF SUMMARY

The present disclosure provides a method, apparatus, and corresponding computer-readable storage medium for editing data that is stored and maintained by a mainframe computing device. In one embodiment, the present disclosure provides a method implemented by a processing circuit of a personal computing device. The method comprises retrieving a Virtual Storage Access Method (VSAM) data block from a mainframe computer via a communications network, wherein the VSAM data block comprises a data record and a control field, generating an editable object from the data record based on control information in the control field, wherein the editable object is modifiable by a productivity application executing on the personal computing device, and determining whether the editable object was modified by the productivity application. If the editable object was modified by the productivity application, the method comprises generating an updated VSAM data block. Such generating comprises updating the data record to comprise modifications made to the editable object, and updating the control field based on the modifications made to the editable object. So updated, the method comprises sending the updated VSAM data block to the mainframe computer via the communications network.

In another embodiment, the present disclosure provides a corresponding personal computing device that comprises a communications interface circuit and a processing circuit operatively coupled to the communications interface circuit. The communications interface circuit is configured to communicate data with a mainframe computer via a communications network. The processing circuit is configured to retrieve a Virtual Storage Access Method (VSAM) data block from the mainframe computer via communications interface circuit, wherein the VSAM data block comprises a data record and a control field, generate an editable object from the data record based on control information in the control field, wherein the editable object is modifiable by a productivity application executing on the personal computing device, and determine whether the editable object was modified by the productivity application. If the editable object was modified by the productivity application, the processing circuit is further configured to generate an updated VSAM data block. Particularly, in one embodiment, the processing circuit is configured to update the data record to comprise modifications made to the editable object and update the control field based on the modifications made to the editable object. The processing circuit is then configured to send the updated VSAM data block to the mainframe computer via the communications network.

In another embodiment, the present disclosure provides a computer-readable storage medium comprising computer program code stored thereon that, when executed by a processing circuit of a computing device, configures the processing circuit to retrieve a Virtual Storage Access Method (VSAM) data block from the mainframe computer via communications interface circuit, wherein the VSAM data block comprises a data record and a control field, generate an editable object from the data record based on control information in the control field, wherein the editable object is modifiable by a productivity application executing on the computing device, and determine whether the editable object was modified by the productivity application. If the editable object was modified by the productivity application, the computer program code configures the processing circuit to generate an updated VSAM data block by update the data record to comprise modifications made to the editable object and update the control field based on the modifications made to the editable object. The computer program code then configures the processing circuit to send the updated VSAM data block to the mainframe computer via the communications network.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 1 is a functional block diagram illustrating a computer network configured according to one embodiment of the present disclosure.

FIG. 2A is a perspective view illustrating the limited functionality provided by a conventional graphical user interface (GUI).

FIG. 2B is a perspective view illustrating the expanded functionality of a GUI of a productivity application executing on a personal computing device according to one embodiment.

DETAILED DESCRIPTION

Figure 3A:
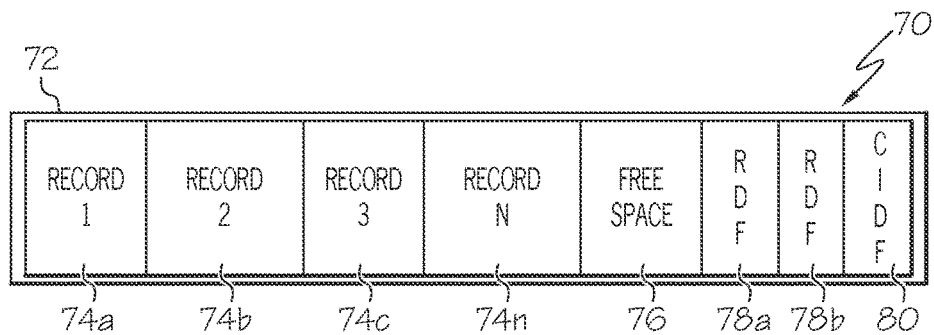
FIGS. 3A-3B illustrate exemplary structures for data blocks according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure provides a computing device, a computer-readable storage medium, and a corresponding computer-implemented method for editing mainframe-based data utilizing a "productivity application" executing on a user's personal computing device. A "productivity application," as used herein, comprises software that allows users to produce information. The software may be for personal use, or for business use, but includes application programs such as word processing applications (e.g., MICROSOFT WORD), spreadsheet applications (e.g., MICROSOFT EXCEL), presentation applications (e.g., MICROSOFT POWER POINT), relational database applications (e.g., MICROSOFT ACCESS), and the like. Such productivity applications are contrasted from utility applications executing on the user's device (e.g., a file manager, database, etc.) that are used to organize and maintain files and folders on the user's device.

In one embodiment, the present disclosure provides a function for the productivity application in the form of a "plug-in" or "add-on." When loaded, the plug-in extends the capabilities of the productivity application to interact directly with a mainframe computer to allow the productivity application to retrieve, edit, and update the data maintained by the mainframe computer. This ability is non-trivial as the personal computers that execute productivity applications are entirely different devices from the mainframe computers that maintain the data. Particularly, personal computers and mainframe computers are designed to meet entirely different needs on vastly different scales, and as such, operate according to non-compatible Operating Systems (OSs), protocols, and command structures. Further, application programs that execute on each computer, as well as the data that is stored by each type of computer, are incompatible with the applications and data on the other computer.

Because of these differences, users conventionally interact with the mainframe data via dedicated "dumb" user terminals. These terminals, however, are compatible only with the mainframe OS and protocols. Further, the applications that facilitate the user interaction with the mainframe data from these terminals execute directly on the mainframe rather. Such applications therefore have a limited audience, and thus, their usability and functionality can, at times, be limited.

In some cases, mainframe data can be manually exported from the mainframe for use by an application executing on a personal computing device. However, in these situations, the exported data must first be manually converted into a form that is compatible with the application. Further, when returning the data to the mainframe, it must be manually exported from the application, manually uploaded to the mainframe, and manually converted back into the form understood by the mainframe computer. Once the upload and conversion is complete, the user may then have to manually import the updated data into the mainframe database using a completely different application.

Configuring a productivity application executing on the personal computing device of a user according to embodiments of the present disclosure, however, provide benefits that conventional methods for accessing mainframe are unable to provide. For example, productivity applications are generally in widespread use in the computing community. Thus, users are very familiar with their well-documented features (e.g., sorting, highlighting specific words and/or phrases, identifying and use of hyperlinks, etc.). Such familiarity facilitates the user's capability to create, edit, and manipulate the data without having to utilize the other lesser-understood conventional applications. Further, the productivity application is configured to automatically attend to the import/export and data conversion functions to ensure interoperability, and in some embodiments, provides the user with a Graphical User Interface (GUI) (e.g., a "Wizard") that eases the burden of selecting desired data from the mainframe.

Turning now to the drawings, FIG. 1 illustrates a system 10 configured for use according to embodiments of the present disclosure. As seen in FIG. 1, system 10 comprises a packet data network 10 that communicatively connects a user's personal desktop computing device 20 (hereinafter, PC 20) with a mainframe computer 40. Network 12 may comprise any private and/or public IP network known in the art, but is configured to communicate data between PC 20 and mainframe 40 in packets. By way of example only, network 12 may be a private ETHERNET network, the Internet, or both, and will generally comprise various servers, routers, gateways, and other such entities to facilitate the communication of data packets over network 12.

Mainframe 40 is a computing device that may be associated with, and used primarily by, a large company or corporation. As is known in the art, such as mainframes are very powerful, highly reliable, and stable devices. Thus, mainframe 40 seen in FIG. 1 is specifically designed to perform functions such as execute critical application programs, and collect, store, maintain, and process bulk data, for example. To facilitate the requisite data storage functions, mainframe 40 may be communicatively connected to a mass storage device 42, as is known in the art.

PC 20 may comprise any personal computing device that is known in the art. Although FIG. 1 illustrates PC 20 as a personal desktop computer, this is for illustrative purposes only. Those of ordinary skill in the art will readily appreciate that PC 20 may also comprise a laptop computer, notebook computer, a tablet computer, or any other type of computing device so long as it is capable of executing a productivity application.

As explained in more detail below, PC 20 is configured to execute a productivity application that communicates with mainframe 40 to allow a user to select a set of data maintained by mainframe 40, and to download the selected set of data from mainframe 40. Upon receipt, the productivity application converts the mainframe data into a compatible format so that the user can load and manipulate the data using the productivity application. When the user is finished with the data, the productivity application is configured to process the updated data, modify certain control fields associated with the mainframe data, re-convert the data into a format compatible with the mainframe, if necessary, and upload the updated mainframe dataset to the mainframe for storage in the mass storage device 42.

Those of ordinary skill in the art will readily appreciate that the components depicted in FIG. 1 are illustrative only. Other network-based components and entities that are not specifically illustrated or discussed herein may be present in or connected to system 10. Such components include, for example, the previously discussed user terminals (not shown) that connect to the mainframe 40 either directly or via network 12.

As previously stated, conventional methods that facilitate a user's ability to interact with mainframe-based data lack functionality. Further, whatever interfaces are used to present mainframe data are sometimes confusing for the user. FIG. 2A, for example, illustrates one such conventional interface 50 that displays a mainframe dataset 52. As seen in FIG. 2A, dataset 52 comprises one or more data records 54 that are displayed in rows and columns. Further, a section 56 disposed on one side of interface 50, displays the raw data that comprises the dataset 52. With this particular application, there is no easy way for a user to modify the displayed dataset 52 and save it back to the mass storage device 42 via mainframe 40. For example, although users may be able to view and change the data, users cannot, with this interface 50, perform other functions such as searching, sorting, and customizable formatting functions.

According to the present embodiments, however, a productivity application executing on PC 20 is specially configured to provide these functions to a user, and to automatically perform actions with respect to manipulating the mainframe data that a user would find cumbersome and unnecessary. To accomplish this, embodiments of the present disclosure provide a "plug-in" or "add-on" module that launches with the productivity application on PC 20. When executing, the productivity application provides an interface that allows the user to interact with and control the functions of the productivity application. In embodiments of the present disclosure, this interface is enhanced according to the "plug-in" module to allow the user to select, download, manipulate, and update data on mainframe 40, as well as to upload the updated data back to the mainframe for storage in the mass storage device 42. Additionally, the "plug-in" module also performs data conversion functions to convert the data between formats suitable for both the mainframe 40 and the productivity application executing on PC 40, as well as manipulates certain predetermined control fields associated with the mainframe data accordingly.

FIG. 2B illustrates a graphical user interface 60 of a productivity application configured according to one embodiment of the present disclosure. The particular productivity application depicted in FIG. 2B is a spreadsheet application, such as MICROSFT'S EXCEL, for example. However, this is for illustrative purposes only. As stated earlier, the productivity application may comprise any type of application executing on PC 20 that is designed to allow the user to produce information in a personal and/or business setting. Thus, the GUI 60 seen in FIG. 2B may be replaced with the GUI for MICROSOFT'S WORD, or the GUI for POWER POINT, for example, or with the GUI of any similar type of application program.

GUI 60, as seen in FIG. 2B, displays a mainframe dataset 62 comprising one or more data records 64. The value of the data in each data field of a data record 64 is displayed in its own column and row (i.e., a "cell"). As described in more detail later, the plug-in module, which executes simultaneously with the productivity application, facilitates such data organization by mapping the data fields of the mainframe data records 64 to the rows and columns of the spreadsheet associated with GUI 60.

According to embodiments of the present disclosure, the user can employ the functions and features of GUI 60 to manipulate, edit, and transfer the dataset 62 to and from the mainframe 40. For example, as seen in FIG. 2B, the user may decide to sort the data records 64 in the dataset 62 in reverse alphabetical order. To accomplish this action, the user would invoke a dropdown menu 66 and select the "SORT" option. This, in turn, invokes another dropdown sub-menu 68 from which the user may select the "SORT Z to A" option. In short, by configuring the productivity application according to the present disclosure, a user could employ any function or feature that is normally available to the productivity application to interact directly with the mainframe data.

Because mainframe 40 operates according to OSs and protocols that are incompatible with those of PC 20, conventionally configured productivity applications are not able to retrieve, and replace, data records stored by mainframe 40. However, the plug-in of the present disclosure configures the productivity application of PC 20 to communicate data with mainframe 40 in a format that is native to mainframe 40.

Figure 3B:
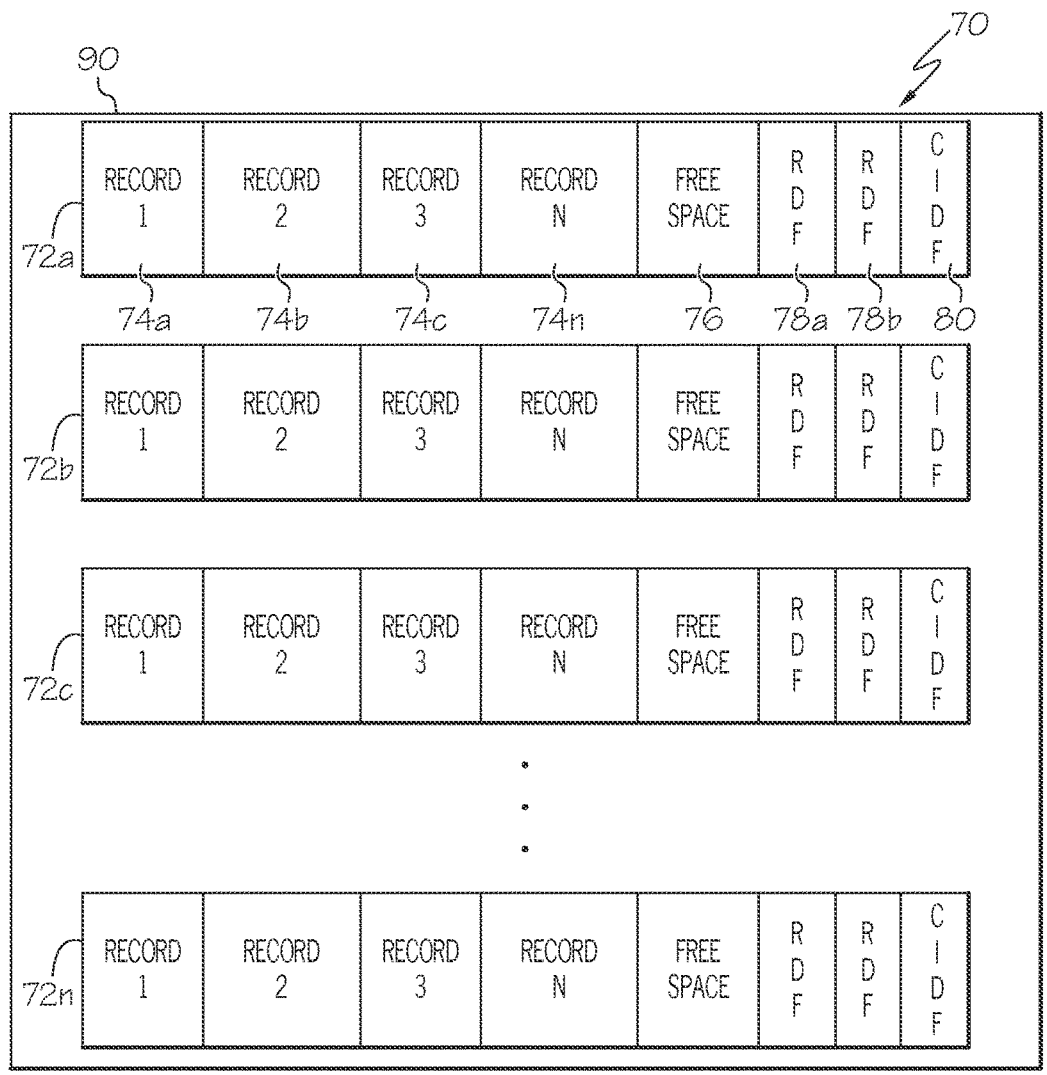

FIGS. 3A and 3B illustrate the structure of an exemplary data block 70 that is maintained by mainframe 40 using the Virtual Storage Access Method (VSAM). As is known in the art, VSAM is a file storage access method used with mainframe operating systems such as MVS, ZOS and OS/390. VSAM particularly facilitates high performance access to a data set, and organizes and maintains data via a catalog structure. Because VSAM utilizes a virtual storage concept, it is able to protect datasets at various levels (e.g., by using passwords). VSAM files can be read sequentially and/or randomly, and allows for both file sharing and batch operations.

As seen in FIGS. 3A-3B, data block 70 is a logical dataset for storing records (i.e., a VSAM Cluster), and in this embodiment, comprises a VSAM Control Interval (CI) 72, and a VSAM Control Area (CA) 90. The VSAM CI 72 is the smallest unit of transfer between a disk and an operating system. Whenever a record is retrieved directly from the storage, the entire CI containing the record is read into a VSAM Input-Output buffer. The desired record is then transferred to a work area from VSAM buffer.

As seen in FIG. 3A, the VSAM CI 72 comprises one or more logical data records 74a-74n (collectively, 74), some volume of contiguous free space 76 to allow for the addition of new data records, and a plurality of control fields 78a, 78b (collectively, 78) and 80. The data records 74 comprise the data that will be manipulated by the productivity application executing on PC 20. The Record Definition Fields (RDF) 78 are each 3 bytes fields that define the length of the data records 74, and also indicate the number of adjacent data records 78 that are of the same length. The Control Interval Descriptor Field (CDIF) 80 is 4 bytes long and includes information about the offset and the length of free space 76 in the VSAM CI 72.

VSAM is configured to insert new data records 78 into a correct order with respect to the other data records 74 already in VSAM CI 72. VSAM is also configured to delete data records 74 while maintaining a correct order for the remaining data records 74. When the size of the VSAM CI 72 reaches its maximum size (i.e., 32K bytes), the VSAM CI 72 is split with about half the fata records 78 being stored in each VSAM CI 72. In each case, however, such operations may require the movement of data records 74 within the VSAM CI 72 to ensure that the free space 76 remains contiguous. Additionally, such operations may require updating the control data values in the RDFs 78 and/or the CIDF 80. As described in more detail below, the productivity application executing on PC 20 is configured to manipulate these data fields, as well as the data within the data records 74.

The VSAM CA 90 comprises two or more VSAM CIs 72, and constitutes a VSAM dataset or data block 70. The size of a VSAM dataset (i.e., data block 70) is always a multiple of the VSAM CA 90, and the data blocks 70 retrieved, manipulated, and stored by the productivity application executing on PC 20 are extended in units of VSAM CAs 90.

Figure 4:
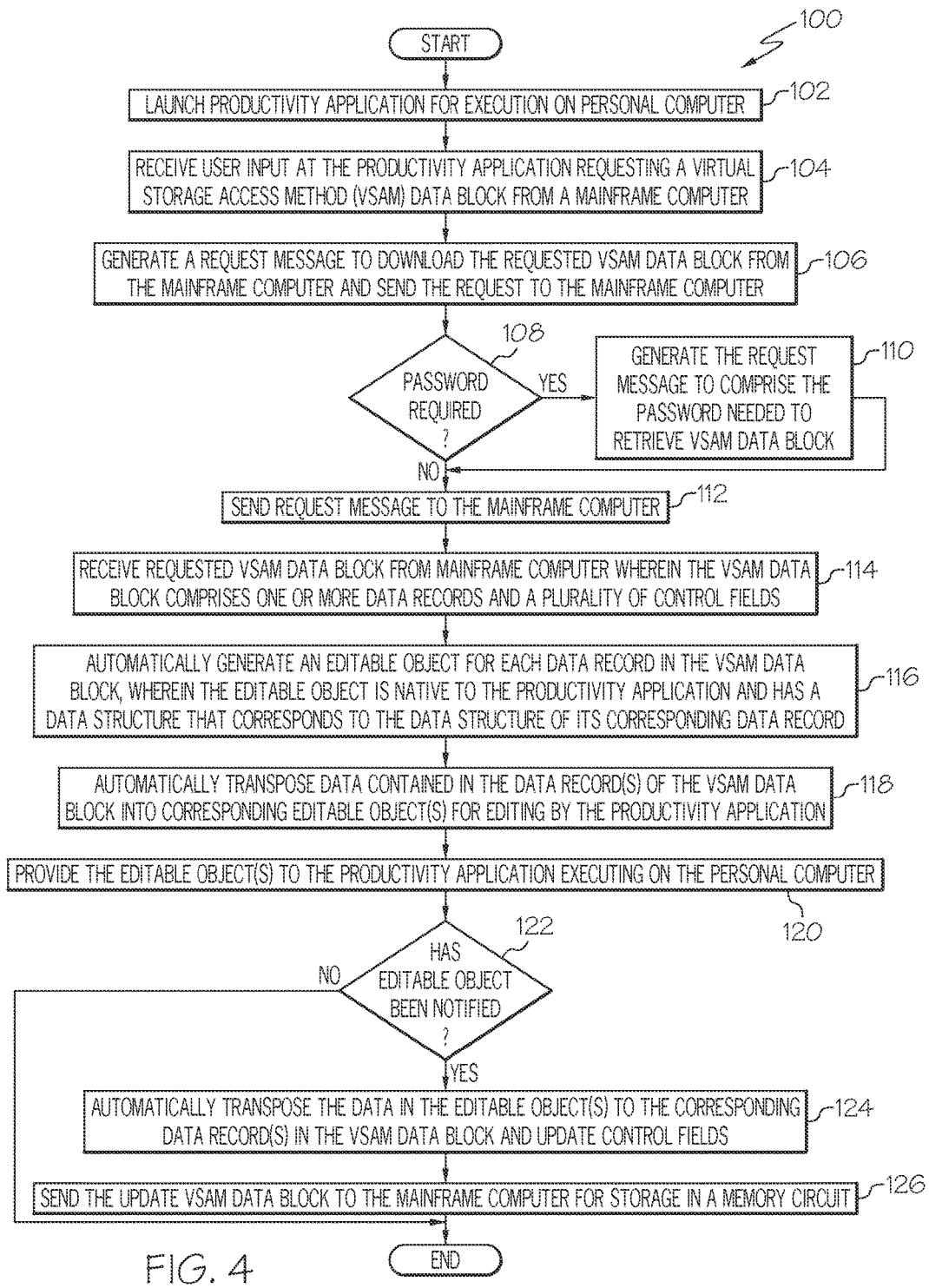
FIG. 4 is a flow diagram illustrating a method for editing mainframe data utilizing a productivity application executing on a personal computing device according to one embodiment of the present disclosure.

FIG. 4 is a flow diagram illustrating a method 100 for editing mainframe data utilizing a productivity application executing on PC 20 according to one embodiment of the present disclosure. Method 100 begins with launching the productivity application for execution on PC 20 (box 102). Launching the productivity application, as stated above, also loads the functionality of the "plug-in" or "add-on" that configures the productivity application according to embodiments of the present disclosure.

In this embodiment, the productivity application comprises a spreadsheet application, such as MICROSOFT'S EXCEL; however, those of ordinary skill in the art will readily appreciate that this is for illustrative purposes only. Productivity application may be any user application that allows users to produce information, regardless of whether it is for personal use, or for business use, but excludes utility applications executing on the user's device (e.g., a file manager, database, etc.) that are used to organize and maintain files and folders on the user's device.

Once loaded, the productivity application receives user input requesting a VSAM data block 70 from mainframe 40 (box 104). The productivity application then generates a message to send to the mainframe 40 requesting a VSAM data block 70 (box 106). The request message may comprise data parameters provided by the user as part of the user input specifying a specific data record or records, as is known in the art. In some cases, a password is required by the VSAM system on mainframe 40 to access the data. Thus, if a password is required (box 108), the productivity application will generate the request message to include the password (box 110). Once generated, the productivity application will send the request message to the mainframe 40 via network 12 (box 112), and thereafter, receives the requested data in the form of a VSAM data clock 70, which as described above, comprises a VSAM CA 90 having one or more VSAM CIs 72 (box 114).

Generally, productivity application is not able to edit the data in the data records 72 in the format received from the mainframe 40. Therefore, in one embodiment, the productivity application automatically generates an editable object for each data record 72 received with the VSAM data block 90 (box 116). The editable objects are in a format that is native to the productivity application executing on PC 20, and are generated to comprise a data structure that corresponds to the data structure of its VSAM data record 74 counterpart. Productivity application then transposes the data contained in each data record 74 of each VSAM CI 72 into a corresponding editable object for processing by the productivity application (box 118).

The transposing process performed by the "plug-in" or "add-in" module "maps" the data in each of the data records to corresponding data fields in the editable objects. Additionally, however, the transposing process also configures the productivity application to perform specifically useful functions. Such functions may be performed automatically in response to, for example, the detection of predefined tags within the data records 72. Alternatively, the functions may be controlled by the user. For example, the data in the data records 72 may be automatically parsed by the productivity application to locate pre-defined strings or other values. Once located, those strings or values may be formatted according to a user-defined (or pre-defined) format. By way of example only, a numeric value may be automatically formatted to be an integer or a float data type with a specified number of decimal places. In another example, a particular string, term, or sentence may be located and highlighted, or formatted to appear in a "title" format, or formatted to appear in a specific font and/or size. Additionally, data in the data records 72 may be formatted to appear as clickable links (e.g., an HTML link) so that users can click on them upon being displayed by the productivity application.

Other functions are also possible when the transposing process is performed. For example, where the data in the data records 72 comprises source code, such functions include, but are not limited to, highlighting of the source code, and automatically creating rules (e.g., formatting rules) for comments, commands, and keywords in the source code. In still other cases, the transposing process may automatically apply a predefined template to the data that allows for expansion of the language. Such templates may be pre-defined, for example, and/or customized by a user of the productivity application.

Once transposed, the "plug-in" or "add-in" provides the editable objects to the productivity application executing on PC 20 so that the user can manipulate the data in the same manner that he/she manipulates data that is native to the PC 20 platform (box 120). For example, the user may add, modify, and/or delete data, add and/or delete data records, modify the data formatting, or perform any function on the data that is natively provided by the particular productivity application. At some point, however, the user may want to save the modified data back to the mainframe 40. To accomplish this, the "plug-in" or "add-in" is configured to perform the reverse of the functions described above.

Particularly, the productivity application configured according to the "plug-in" or "add-in" will first determine whether the data being provided by the productivity application for storage by mainframe 40 has been modified (box 122). By way of example, an indicator bit, or other such construct, may be set by the productivity application upon altering the data in at least one data record 72. Upon receiving a command to "save" the data, the "plug-in" or "add-in" will first check the indicator. If the indicator indicates that the data has not been altered, method 100 simply ends. Otherwise, the productivity application configured according to the "plug-in" or "add-in" automatically transpose the data in the editable object(s) to the corresponding data record(s) 72 in the VSAM data block 70, and update the control fields 78, 80, as appropriate (box 124). Then the VSAM data block is sent back to mainframe 40, where it is processed and stored in a memory circuit, such as DB 42 (box 126).

Figure 5:
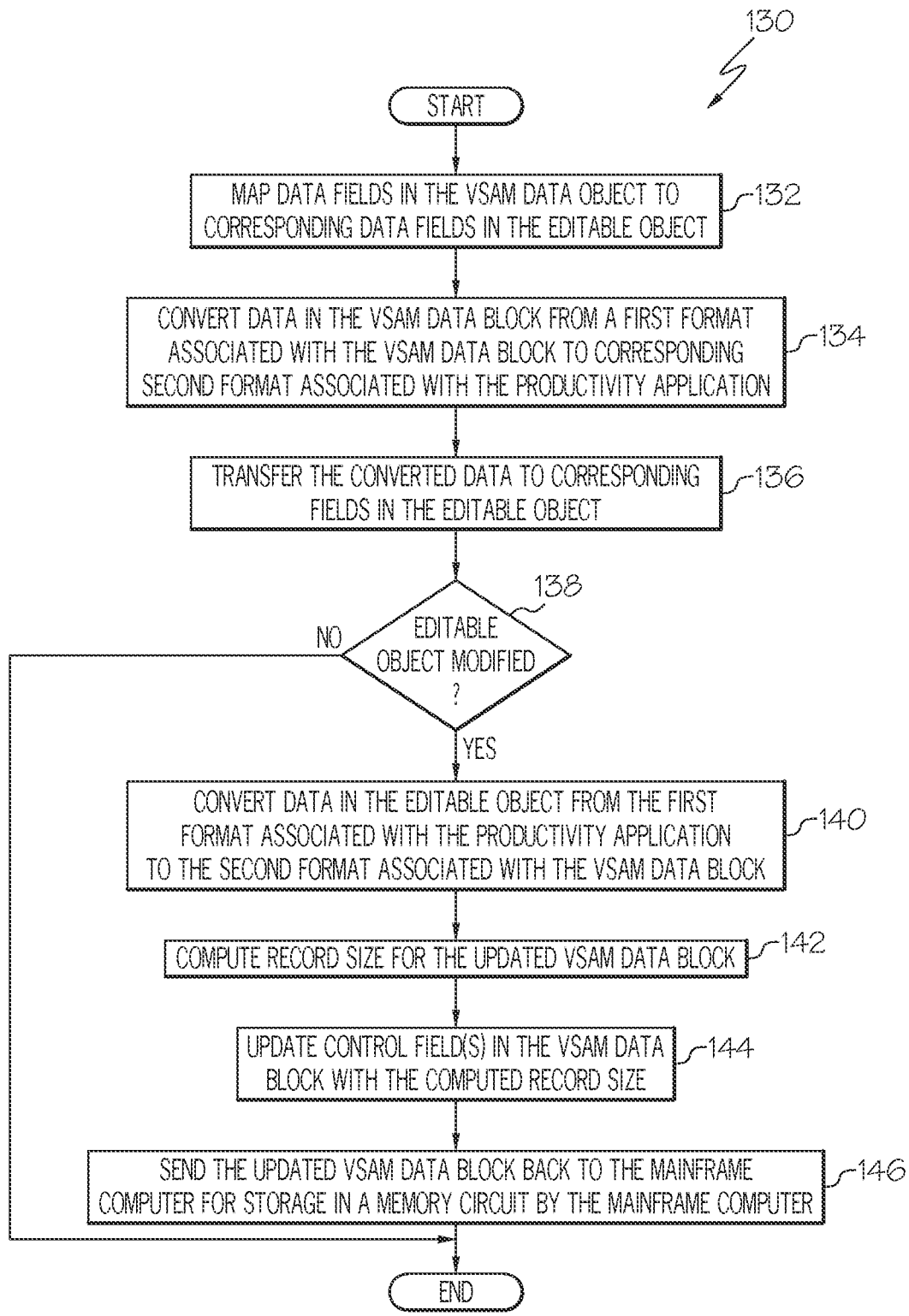
FIG. 5 illustrates a method for editing mainframe data utilizing a productivity application executing on a personal computing device according to another embodiment of the present disclosure.

FIG. 5 illustrates a method 130 for transposing the data between the data record(s) 72 and the editable objects in more detail. Method 130 begins with the productivity application configured according to the "plug-in" or "add-in" mapping the data fields in the data records 72 to corresponding data fields in the editable objects (box 132). The information required for this mapping may be accomplished, for example, by parsing the data records 72 or by retrieving the information from a file that contains this information, for example. Once the data fields are mapped, productivity application converts the data in the VSAM data block 70 (i.e., the data records 72 and the control fields 78, 80) from a format associated with the VSAM data block 70 to a format associated with the productivity application executing on the PC 20 platform (box 134), and transfers the converted data to the editable objects (box 136). As stated above, this process may also entail the automatic parsing and/or formatting of the data according to user-defined or system-defined parameters or tags.

To return the data, the productivity application configured according to the "plug-in" or "add-in" will first determine whether the editable object has been modified, as previously described (box 138). If not, the method ends, as there is no need to waste bandwidth and other resources to return the data to mainframe 40 over the IP network 12. However, if the data was modified, the productivity application configured according to the "plug-in" or "add-in" converts the data back into the format associated with the VSAM data block 70 (box 140) and computes a new record size for the updated VSAM data block (box 142). As stated above, such computations may involve the productivity application re-arranging the data records so that they are in the appropriate order and/or computing the amount of free space left in one or both of the VSAM CAs 90 and the VSAM CIs 72 (box 142). The productivity application then updates the control fields 78, 80 of the VSAM data block 70 with the appropriate computed values (box 144) and sends the updated VSAM data block 70 back to the mainframe 40 for storage in DB 42 (box 146).

Figure 6:
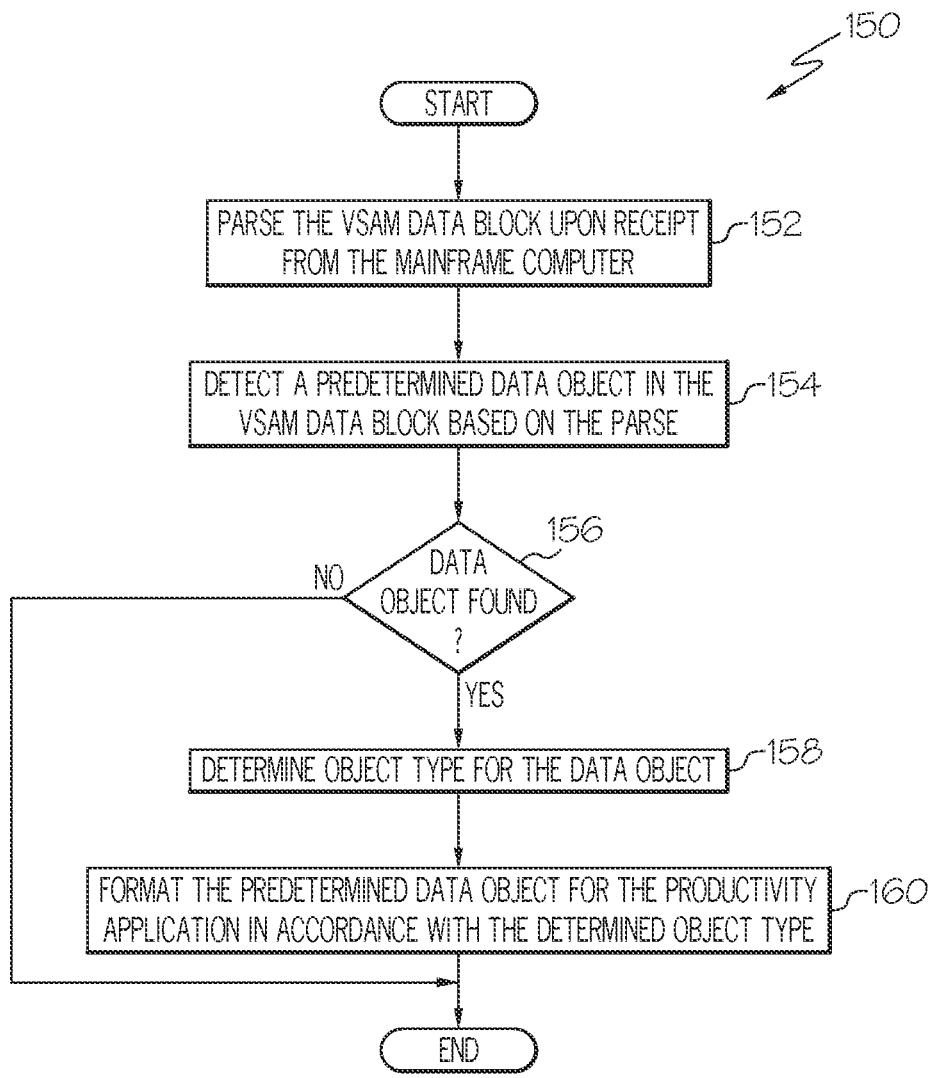
FIG. 6 illustrates a method for altering the format of a data object in the mainframe data according to one embodiment of the present disclosure.

FIG. 6 illustrates a method 160 for altering the format of a data object in the data records 72 according to one embodiment of the present disclosure. In this embodiment, the so-called data object comprises a string, but may alternatively comprise any other data type.

As seen in FIG. 6, the productivity application is configured to automatically parse the data in the data records 72 of the VSAM data block 70 upon receipt from the mainframe 40 (box 152). Once parsed, the productivity application is configured to search for, and detect, the data objects that make up the data records 72, and format them accordingly. If the data object is not found in the data records 72 (box 156), method 150 ends. Otherwise, the productivity application determines an object type for the data object (e.g., string, integer, float, etc.) (box 158), and formats the data object in accordance with the determined object type. In this manner, the productivity application configured according to the present disclosure maintains data typing across the two different platforms.

Of course, as previously described, the productivity application of the present disclosure may apply a particular formatting to a data object that is different than the original formatting of the data object with respect to mainframe 40. Such formatting may be triggered by user input and/or by tags detected within the data of the data records 72.

Figure 7:
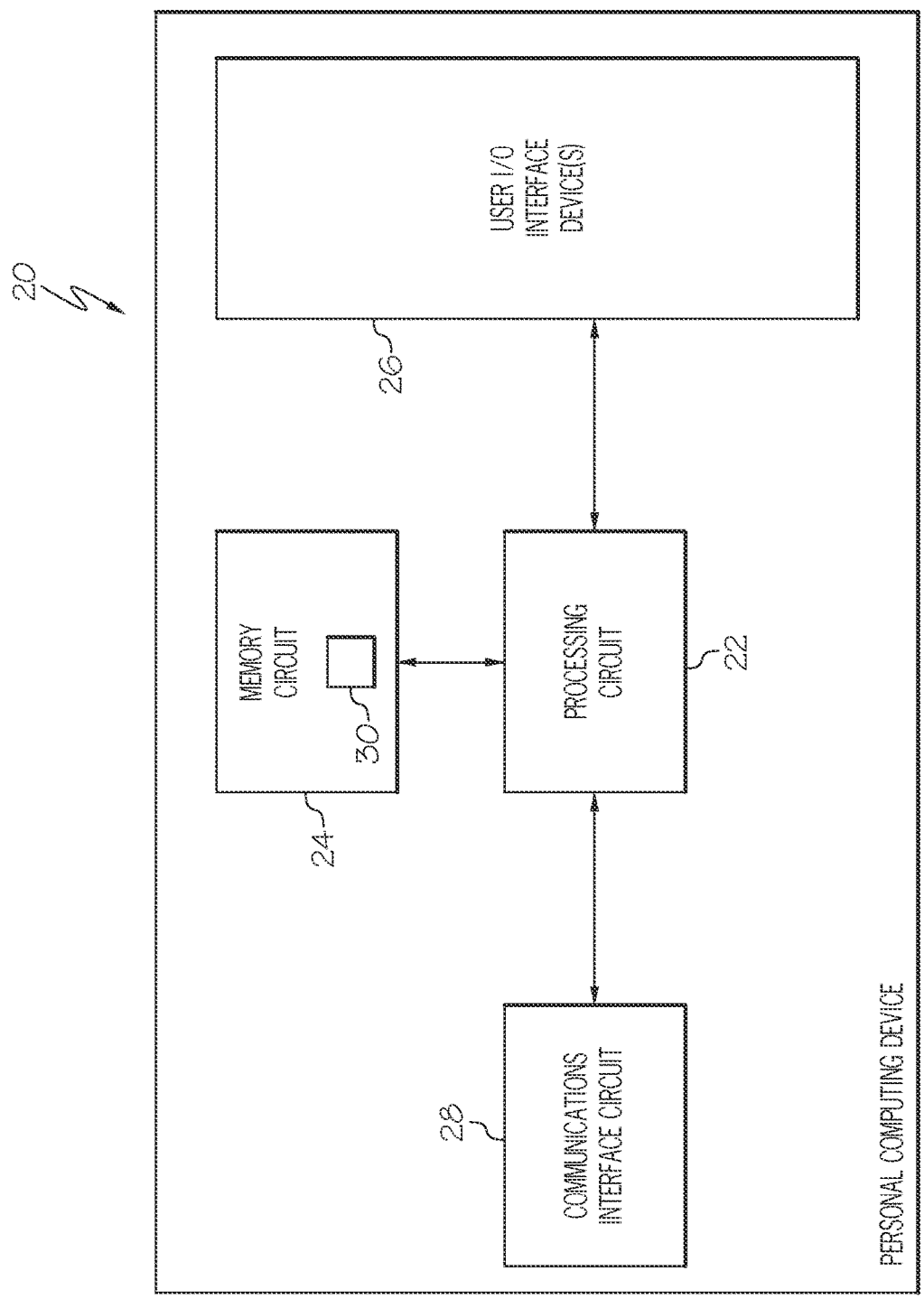
FIG. 7 is a functional block diagram illustrating some components of a personal computing device configured according to one embodiment of the present disclosure.

FIG. 7 is a functional block diagram of a computing device, such as PC 20, configured to perform the embodiments of the present disclosure. As seen in FIG. 7, PC 20 comprises, inter alia, a processing circuit 22, a memory circuit 24, a user Input/Output (I/O) interface 26, and a communications circuit 28. Those skilled in the art will readily appreciate that PC 20 is not limited solely to the components seen in the figure, but rather, may comprise other hardware and/or software components as needed or desired.

Processing circuit 22 may be implemented by circuitry comprising one or more microprocessors, hardware, firmware, or a combination thereof. Generally, processing circuit 22 controls the operation and functions of the PC 20 according to appropriate standards. Such operations and functions include, but are not limited to, communicating with mainframe 40 via network 12. Additionally, according to various embodiments of the present disclosure, processing circuit 22 is configured to execute the productivity application configured according to the "plug-in" or "add-on" to perform the method of the present disclosure according to the embodiments as previously described.

Memory 24 may comprise any non-transitory, solid state memory or computer readable storage media known in the art. Suitable examples of such media include, but are not limited to, ROM, DRAM, Flash, or a device capable of reading computer-readable storage media, such as optical or magnetic storage media. Memory circuit 24 stores programs and instructions, such as the productivity application 30 configured according to the "plug-in" or "add-on" previously mentioned. When executed by the processing circuit 22, the productivity application 30 configures the processing circuit 22 to retrieve data block 70 from, process the data in data records 72 and control fields 78, 80, and return data block 70 to mainframe 40, according to the embodiments previously described.

The user I/O interface 26 comprises the components necessary for a user to interact with PC 20. Such components include, but are not limited to, a display device that displays the GUI associated with the productivity application 30, a keyboard, a mouse, and any other input/output mechanisms or devices that facilitate the user's ability to interact with PC 20 according to embodiments of the present disclosure.

The communications interface circuitry 28 may comprise, for example, an I/O card or other interface circuit configured to communicate data and information with mainframe 40 via network 12. As those of ordinary skill in the art will readily appreciate, the communications interface circuit 28 may communicate with these and other entities using any known protocol needed or desired. In one embodiment, however, communications interface circuitry 28 sends data to and receives data from mainframe 40 via network 12 in data packets according to the well-known ETHERNET protocol. In this regard, communications interface circuitry 22 may comprise an ETHERNET card, but may also comprise circuitry capable of wireless communications such as over WiFi, for example.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method implemented by a processing circuit of a personal computing device, the method comprising:
  retrieving a Virtual Storage Access Method (VSAM) data block from a mainframe computer via a communications network, wherein the VSAM data block comprises a data record and a control field;
  generating an editable object from the data record based on control information in the control field, wherein the editable object is modifiable by a productivity application executing on the personal computing device, wherein a data structure of the editable object corresponds to a data structure of the data record, and wherein generating the editable object includes formatting the editable object based on an object type of a data object included in the data record;
  determining whether the editable object was modified by the productivity application; and
  responsive to determining that the editable object was modified by the productivity application, generating an updated VSAM data block, including by:
    updating the data record to comprise modifications made to the editable object, wherein updating the data record comprises:
      converting data in the editable object from a first format associated with the productivity application to a second different format associated with the VSAM data block;
      transferring the converted data to the data record;
      updating the control field based on the modifications made to the editable object; and
      sending the updated VSAM data block to the mainframe computer via the communications network.

2. The method of claim 1 wherein retrieving a Virtual Storage Access Method (VSAM) data block from a mainframe computer comprises:
  receiving user input selecting a file name associated with the VSAM data block;
  generating a request message to download the VSAM data block from the mainframe computer responsive to receiving the user input; and
  sending the request message to the mainframe computer via the communications network.

3. The method of claim 2 wherein generating a request message to download the VSAM data block comprises generating the request message to comprise a password to access the VSAM data block.

4. The method of claim 1, further comprising:
  mapping data fields in the data record to corresponding data fields in the editable object; and
  transferring data from the data fields in the data record to the corresponding data fields in the editable object based on the mapping.

5. The method of claim 1 wherein updating the control field based on the modifications made to the editable object comprises:
  computing a record size for the editable object; and
  updating the control information in the control field to indicate the record size computed for the editable object.

6. The method of claim 1 wherein the VSAM data block comprises a VSAM Control Interval (CI) comprising a plurality of data records and a plurality of control fields.

7. The method of claim 6 wherein the VSAM data block comprises VSAM dataset, the VSAM dataset further comprising a VSAM Control Area (CA) that comprises a plurality of VSAM CIs.

8. A personal computing device comprising:
  a communications interface circuit configured to communicate data with a mainframe computer via a communications network; and
  a processing circuit operatively coupled to the communications interface circuit and configured to:
    retrieve a Virtual Storage Access Method (VSAM) data block from the mainframe computer via the communications interface circuit, wherein the VSAM data block comprises a data record and a control field;
    generate an editable object from the data record based on control information in the control field, wherein the editable object is modifiable by a productivity application executing on the personal computing device, wherein a data structure of the editable object corresponds to a data structure of the data record, and wherein generating the editable object includes formatting the editable object based on an object type of a data object included in the data record;
    determine whether the editable object was modified by the productivity application; and
    responsive to determining that the editable object was modified by the productivity application, generate an updated VSAM data block, wherein to generate the updated VSAM data block, the processing circuit is configured to:
      update the data record to comprise modifications made to the editable object, wherein to update the data record to comprise modifications made to the editable object, the processing circuit is configured to:
      convert data in the editable object from a first format associated with the productivity application to a second different format associated with the VSAM data block;
      transfer the converted data to the data record;
      update the control field based on the modifications made to the editable object; and
      send the updated VSAM data block to the mainframe computer via the communications network.

9. The personal computing device of claim 8 wherein to retrieve a Virtual Storage Access Method (VSAM) data block from a mainframe computer, the processing circuit is further configured to:
  receive user input selecting a data file name associated with the VSAM data block;
  generate a request message to download the VSAM data block from the mainframe computer responsive to the user input; and
  send the request message to the mainframe computer via the communications network.

10. The personal computing device of claim 9 wherein the processing circuit is further configured to generate the request message to download the VSAM data block to comprise a password to access the VSAM data block.

11. The personal computing device of claim 8, wherein the processing circuit is further configured to:
  map data fields in the data record to corresponding data fields in the editable object; and
  transfer data from the data fields in the data record to the corresponding data fields in the editable object based on the mapping.

12. The personal computing device of claim 8 wherein to update the data record to comprise modifications made to the editable object, the processing circuit is configured to:
compute a record size for the editable object; and
update the control information in the control field to indicate the record size computed for the editable object.

13. The personal computing device of claim 8 wherein the VSAM data block is a VSAM Control Interval (CI) comprising a plurality of data records and a plurality of control fields.

14. The personal computing device of claim 13 wherein the VSAM data block is a VSAM dataset, and wherein the VSAM dataset comprises a VSAM Control Area (CA) comprising a plurality of VSAM CIs.

15. A non-transitory computer-readable storage medium comprising computer program code stored thereon that, when executed by a processing circuit of a computing device, causes the computing device to perform operations comprising:
retrieve a Virtual Storage Access Method (VSAM) data block from a mainframe computer via a communications interface circuit, wherein the VSAM data block comprises a data record and a control field;
generate an editable object from the data record based on control information in the control field, wherein the editable object is modifiable by a productivity application executing on the computing device, wherein a data structure of the editable object corresponds to a data structure of the data record, and wherein generating the editable object includes formatting the editable object based on an object type of a data object included in the data record;
determine whether the editable object was modified by the productivity application; and
responsive to determining that the editable object was modified by the productivity application, generate an updated VSAM data block, wherein to generate the updated VSAM data block, the processing circuit is configured to:
update the data record to comprise modifications made to the editable object, wherein to update the data record to comprise modifications made to the editable object, the processing circuit is configured to:
convert data in the editable object from a first format associated with the productivity application to a second different format associated with the VSAM data block; and
transfer the converted data to the data record;
update the control field based on the modifications made to the editable object; and
send the updated VSAM data block to the mainframe computer via the communications interface circuit.

* * * * *